US011236211B2

(12) United States Patent
Honda et al.

(10) Patent No.: US 11,236,211 B2
(45) Date of Patent: Feb. 1, 2022

(54) FOAM AND PRODUCTION METHOD THEREOF

(71) Applicant: TORAY INDUSTRIES, INC., Tokyo (JP)

(72) Inventors: Taiyo Honda, Otsu (JP); Yusuke Kojima, Otsu (JP); Yuki Enami, Otsu (JP)

(73) Assignee: TORAY INDUSTRIES, INC., Tokyo (JP)

(*) Notice: Subject to any disclaimer, the term of this patent is extended or adjusted under 35 U.S.C. 154(b) by 239 days.

(21) Appl. No.: 16/491,933

(22) PCT Filed: Jan. 18, 2018

(86) PCT No.: PCT/JP2018/001444
§ 371 (c)(1),
(2) Date: Sep. 6, 2019

(87) PCT Pub. No.: WO2018/163612
PCT Pub. Date: Sep. 13, 2018

(65) Prior Publication Data
US 2021/0130564 A1    May 6, 2021

(30) Foreign Application Priority Data

Mar. 8, 2017   (JP) .............................. JP2017-043506

(51) Int. Cl.
*C08J 9/10*         (2006.01)
*C08J 9/00*         (2006.01)
*C08J 9/36*         (2006.01)

(52) U.S. Cl.
CPC ............... *C08J 9/10* (2013.01); *C08J 9/0061* (2013.01); *C08J 9/36* (2013.01); *C08J 2201/02* (2013.01); *C08J 2300/26* (2013.01); *C08J 2323/08* (2013.01)

(58) Field of Classification Search
CPC ..... C08J 9/10; C08J 9/0061; C08J 9/36; C08J 2201/02; C08J 2300/26; C08J 2323/08; C08J 2423/08; C08J 2423/2353; C08J 2423/00; C08J 2453/00; C08J 2207/02; C08J 9/103; C08J 2423/06; C08J 2400/26; C08J 2423/12; C08J 9/34; C08J 2323/12; C08J 2325/06
See application file for complete search history.

(56) References Cited

U.S. PATENT DOCUMENTS

2011/0262744 A1   10/2011  Hatanaka et al.

FOREIGN PATENT DOCUMENTS

| JP | 1-222929 A | 9/1989 |
|----|------------|--------|
| JP | 2011-231171 A | 11/2011 |
| JP | 2016-155344 A | 9/2016 |
| JP | 2016155344 A * | 9/2016 |

OTHER PUBLICATIONS

International Search Report, issued in PCT/JP2018/001444, PCT/ISA/210, dated Apr. 24, 2018.
Written Opinion of the International Searching Authority, issued in PCT/JP2018/001444, PCT/ISA/237, dated Apr. 24, 2018.

* cited by examiner

*Primary Examiner* — Kara B Boyle
(74) *Attorney, Agent, or Firm* — Birch, Stewart, Kolasch & Birch, LLP

(57) ABSTRACT

One object of the present invention is to provide a polyolefin resin foam which does not have a difference between the front side and the back side on the top and bottom surfaces which sandwich in the thickness direction the foam which is excellent in flexibility, buffer property, and heat insulation property despite its thinness, and which can be used suitably in the fields of architecture, electricity, electronics, vehicles, and the like as a variety of heat-resistant sealing materials. The surface hardness of the foam measured by a micro rubber hardness tester is 30° or more and 70° or less, and the centerline average roughness Ra75 of a first surface portion on one side of the foam in the thickness direction and of a second surface portion on the other side of the foam in the thickness direction is 5 μm or more and 20 μm or less.

8 Claims, No Drawings

FOAM AND PRODUCTION METHOD THEREOF

TECHNICAL FIELD

The present invention relates to a polyolefin resin foam and a foam member. More particularly, the present invention relates to a polyolefin resin foam that can be suitably used as a sealing material, a heat insulating material, a protective material and the like due to its thinness and excellent heat resistance and flexibility; and a method of producing the polyolefin resin foam.

BACKGROUND ART

Polyolefin resin foams have uniform and fine closed cells, are lightweight and show excellent heat insulation property, buffer property, and processability. By virtue of these characteristics, the polyolefin resin foams are used as laminates in various applications such as in single-sided and double-sided adhesive tape materials, protective sheet materials, and the like.

As a substrate of this kind of adhesive tapes or sheets, a sheet of a synthetic resin foam which is relatively flexible is used. In particular, a foam sheet obtained by foaming a polyolefin resin such as polyethylene, polypropylene, or the like is generally used, and an adhesive is applied to one side or both sides of the foam.

In recent years, there has been a demand for improved heat resistance of foams for several reasons: in response to rapid progress of global warming phenomenon and heat generation of equipment after a long-term use of electronic devices; for seal fixing materials such as automotive interior materials used under a high temperature environment; and the like.

In Patent Documents 1 and 2, in order to obtain a thickness suitable as an adhesive sheet material, an adhesive sheet is disclosed, which is obtained by foaming a polyolefin resin such as polyethylene, polypropylene or the like and slicing the resulting foam. However, there is a problem of reduced tensile strength because the slicing alone results in a foam which breaks easily when applied with stress or a problem of the occurrence of different sides of a front side and a back side on the top surface and the bottom surface in the thickness direction in which the foam is sandwiched.

In Patent Document 3, a mixture of polylactic acid, a polyolefin resin and a polyolefin resin copolymer is used as a resin for forming a foam member, but the use of polylactic acid causes a problem of heat resistance and deterioration over time.

In Patent Document 4, since polyethylene is used in a resin which forms a foaming member, there is a limitation on the usage in the case which requires heat resistance. In addition, a foam in which synthetic rubber or natural rubber such as polyurethane rubber, ethylene-propylene-diene copolymer rubber (EPDM), ethylene-propylene copolymer rubber (EPR), chloroprene rubber, or the like, is used as a resin which forms a foam member also has a problem of heat resistance. Since the foam itself is not heat resistant, the dimensional change of the foam causes a problem in a high temperature environment, specifically in an environment of 100° C. or more.

PRIOR ART DOCUMENTS

Patent Documents

Patent Document 1: JP H07-166139A
Patent Document 2: JP2016-108422 A
Patent Document 3: WO2006/103969 pamphlet
Patent Document 4: JP2017-66404 A

SUMMARY OF THE INVENTION

Problems to be Solved by the Invention

One object of the present invention is to provide a polyolefin resin foam which is excellent in flexibility, buffer property and heat insulation property despite its thinness, does not have difference between the top surface and on the bottom surface, and shows heat resistance, and can be used suitably as a variety of sealing materials in the fields of architecture, electricity, electronics, vehicles, and the like; and a method of producing the polyolefin resin foam.

Means for Solving the Problems

After intensive studies to solve the above problems, the inventors have found that a foam having the following characteristics can overcome the problems. That is,
(1) Provided is a foam, wherein: the surface hardness of the foam measured by a micro rubber hardness tester is 30° or more and 70° or less; and the centerline average roughness Ra75 of a first surface portion on one side of the foam and of a second surface portion on the other side of the foam in the thickness direction is 5 or more and 20 µm or less.
(2) Further provided is the foam according to the above (1), wherein: the thermal shrinkage rate in the length direction (MD) or in the width direction (TD) after 1 hour in a temperature environment of 100° C. is −15% to 1%; and the 25% compression hardness is 50 kPa or less.
(3) Further provided is the foam according to the above (1) or (2), comprising a polypropylene resin and a thermoplastic elastomer, wherein: the endothermic peaks measured by a differential scanning calorimeter (DSC) occur in a range of at least 100° C. or more and 130° C. or less and at 145° C. or more; and the melting heat capacity is 50 J/g or less.
(4) Further provided is the foam according to any one of the above (1) to (3), wherein the first surface portion on one side of the foam and the second surface portion on the other side of the foam in the thickness direction, and the inside portion of the foam are formed from the same resin composition.
(5) Further provided is the foam according to any one of the above (1) to (4), wherein the following (Formula 1) and (Formula 2) are satisfied in either or both of the first surface portion and the second surface portion:

the thickness of a pseudo skin layer≤3 µm (Formula 1)

the thickness of a pseudo skin layer/the thickness of a cell wall inside the foam≤1.5 (Formula 2)
(6) Further provided is a method of producing a foam: comprising the steps of foaming a resin composition comprising at least a polypropylene resin and a thermoplastic elastomer to produce a foam sheet having a skin layer of 3 µm or more on both of the top and bottom surfaces in the thickness direction; slicing the foam sheet in the thickness direction to produce a foam sheet not having a skin layer; and heating the foam sheet subjected to slicing.
(7) Further provided is the method of producing a foam according to the above (6), wherein the foam sheet is stretched at a stretch ratio of 110% or more in the step of heating the foam sheet subjected to slicing.
(8) Further provided is the method of producing a foam according to the above (6) or (7), wherein the foam sheet is heated so that the surface temperature is within the range of (Formula 3) in the step of heating the foam sheet subjected to slicing:

$Tm-20($° C.$)\leq H \leq Tm+60($° C.$)$ (Formula 3)

wherein Tm: melting point (° C.) of the resin or the resin composition constituting the surface of the foam sheet, H: surface temperature (° C.) of the foam sheet.

(9) Further provided is the method of producing a foam according to any one of the above (6) to (8), further comprising the step of compressing the foam sheet in the thickness direction.

Effect of the Invention

Despite its thinness, the foam of the present invention is excellent in buffer property, heat insulation property and heat resistance, does not have a difference between the front side and the back side on the top surface and on the bottom surface, and shows excellent flexibility. Thus, the foam of the present invention can be used suitably used as a variety of sealing materials, heat insulating materials, and protective materials.

MODE FOR CARRYING OUT THE INVENTION

The present invention will be described below in detail. The detailed methods of the various measurements described below are as explained in Examples.

In the present invention, the length direction means a direction corresponding to the direction of extrusion (longitudinal direction of a long sheet) when a foam sheet is produced. The "MD" is an abbreviation for Machine Direction, which means the length direction. The width direction means a direction which is perpendicular to the length direction and parallel to the foam sheet (width direction). The "TD" is an abbreviation for Transverse Direction, which means the width direction. The thickness direction is a direction perpendicular to both the longitudinal direction and the width direction. The thickness direction is also abbreviated as ZD.

The above description assumes a molding method in which a resin is discharged from a die and foamed. In a batch molding method in which a resin is introduced into a mold and foamed, the present invention can be understood as follows: the longest side corresponds to the length direction, the shortest direction which is perpendicular to the longitudinal direction corresponds to the thickness direction, and the direction which is perpendicular to both the length direction and the thickness direction corresponds to the width direction.

In the foam of the present invention, the numerical value of the surface hardness of the foam measured with a micro rubber hardness tester is 30° or more and 70° or less. The surface hardness is an index showing the flexibility and the tracking ability to a product base material, and is preferably 30° or more and 70° or less because in this range, in the case of attachment as an adhesive sheet material, the adhesive sheet material absorbs fine irregularities of the product base material and thus maintains the smoothness. More preferably, the surface hardness is 40° or more and 50° or less.

The surface hardness of the foam of less than 30° is not preferred because the foam is too soft and thus fine irregularities on the substrate are transferred to the surface of the sheet material. When the surface hardness of the foam is more than 70°, the foam is too hard and the adhesion property with respect to the substrate decreases. As a result, the fine irregularities cannot be absorbed and poor adhesion occurs on the sheet material, impairing the appearance.

In the foam of the present invention, the centerline average roughness Ra75 of a first surface portion on one side of the foam in the thickness direction, that is, a portion including one surface of the foam which is parallel to a plane containing the length direction and the width direction, and of a second surface portion on the other side, that is, a portion including the other surface of the foam which is parallel to a plane containing the longitudinal direction and the width direction is 5 µm or more and 20 µm or less. That is, when the centerline average roughness Ra75 of the surface is less than 5 µm, in the case of the application of an adhesive, the adhesive slips easily and repels off the surface to form beads, causing a problem of spots. When the centerline average roughness Ra75 is more than 20 µm, in the case of the application of an adhesive or the like, the adhesive does not fill completely the fine irregularities, resulting in spots. Thus, a problem of adhesion failure or the like occurs.

In the foam of the present invention, the thermal shrinkage rate in the length direction (MD) or in the width direction (TD) after 1 hour in a temperature environment of 100° C. is preferably −15% to 1%, and more preferably −10 to 0% because in the case of the use in an environment of a high temperature or in the case of carrying out a processing treatment, a smaller dimensional change is better. When the thermal shrinkage rate in the length direction (MD) or in the width direction (TD) after 1 hour in a temperature environment of 100° C. is less than −15%, the thermal dimensional change is so large that the foam may peel off or shift from the substrate, which results in lowered buffer property and sealing property. When the thermal shrinkage rate in the length direction (MD) or in the width direction (TD) after 1 hour in a temperature environment of 100° C. is more than 1%, the substrate may be deformed or defects such as blisters, wrinkles or the like may occur.

Furthermore, in the foam of the present invention, the 25% compression hardness is preferably 50 kPa or less, and more preferably 40 kPa or less from the viewpoint of improved flexibility and buffer property. When the 25% compression hardness is greater than 50 kPa, adequate resilience cannot be obtained upon the compression, and thus the sealing property cannot be obtained.

The foam of the present invention has preferably two or more endothermic peaks observed in the differential scanning calorimeter (DSC). Specifically, the endothermic peaks measured by a differential scanning calorimeter (DSC) preferably occur in a range of 100° C. or more and 130° C. or less and at 145° C. or more. The first endothermic peak is more preferably present in a range of 110° C. or more and less than 125° C., and the second endothermic peak is more preferably present at 150° C. or more, and most preferably at 155° C. or more. When the first endothermic peak is at a temperature exceeding 130° C., the softening point during the molding of the foam is too high, which results in too a long molding cycle. When the second endothermic peak is less than 145° C., in the current situation where the heating rate tends to be increased in order to raise the temperature to a sufficient molding temperature, the heat resistance is likely to be insufficient.

The endothermic peak refers to the temperature corresponding to the highest point of the endothermic peak observed in the measurement with a differential scanning calorimeter (DSC).

The melting heat capacity per unit mass of the foam of the present invention measured by a differential scanning calorimeter (DSC) is preferably less than 50 J/g. The melting heat capacity exceeding 50 J/g results in a large crystal component, and the flexibility that the present invention intends to achieve may not be sufficiently obtained. The melting heat capacity is further preferably 45 J/g or less.

The foam of the present invention preferably contains at least a polypropylene resin and a thermoplastic elastomer resin in order to achieve both of the heat resistance and the flexibility as described above. When the content of the polypropylene resin is increased, the heat resistance improves, and the thermal dimensional change is reduced, but the flexibility decreases, and the surface hardness and the 25% compression hardness increase. When the content of the thermoplastic elastomer increases, the flexibility improves, but the thermal dimensional change tends to deteriorate. The surface hardness, the 25% compression hardness, and the thermal dimensional change of the foam are not determined only by the composition of the resin, but from the above viewpoint, the content of the polypropylene resin is preferably 10 to 80% by weight and the content of the thermoplastic elastomer is preferably 10 to 80% by weight, when the resin constituting the foam is considered as 100% by mass.

Examples of the polypropylene resins used for the foam of the present invention include homopolypropylene, ethylene-propylene random copolymers, ethylene-propylene block copolymers and the like. As necessary, copolymers of a propylene monomer with other copolymerizable monomers can be also used. One kind of the polypropylene resins may be used alone, or two or more kinds may be used in combination. Any conventionally known polypropylene resin can be used.

There is no particular limitation on the polymerization method of these polypropylene resins, and examples thereof include high pressure polymerization, slurry polymerization, solution polymerization and gas phase polymerization. The polymerization catalysts are also not particularly limited, and examples thereof include Ziegler catalysts, metallocene catalysts and the like.

As the above-mentioned polypropylene resin, ethylene-propylene random copolymers and ethylene-propylene random·block copolymers having a melting point of 135° C. or more and less than 160° C. and an MFR (230° C.) of 0.5 g/10 min or more and less than 5.0 g/10 min, in which the ethylene content in 100% by mass of the polypropylene resin is 1% by mass or more and less than 15% by mass, or ethylene-propylene block copolymers or homopolypropylene having a melting point of 150° C. or more and less than 170° C. and an MFR (230° C.) of 1.0 g/10 min or more and less than 7.0 g/10 min, in which the ethylene content is 1% by mass or more and less than 15% by mass, are particularly preferably used. The term "block" of ethylene-propylene random·block copolymers and ethylene-propylene block copolymers means that ethylene-propylene random copolymers and homo-polypropylene are mixed with ethylene-propylene rubber, and this is different from the block structure generally described in polymer chemistry.

Examples of the thermoplastic elastomer resin include polystyrene thermoplastic elastomers (SBC, TPS), polyolefin thermoplastic elastomers (TPO), vinyl chloride thermoplastic elastomers (TPVC), polyurethane thermoplastic elastomers (TPU), polyester thermoplastic elastomers (TPEE, TPC), polyamide thermoplastic elastomers (TPAE, TPA), polybutadiene thermoplastic elastomers, hydrogenated styrene butadiene rubber (HSBR), styrene ethylene butylene·olefin crystalline block polymers (SEBC), olefin crystalline·ethylene butylene·olefin crystalline block polymers (CEBC), styrene·ethylene butylene·styrene block polymers (SEBS), block copolymers such as olefin block copolymers (OBC) and the like, and graft copolymers such as polyolefin-vinyl graft copolymers, polyolefin-amide graft copolymers, polyolefin-acrylic graft copolymers, polyolefin-cyclodextrin graft copolymers, and the like. Any conventionally known thermoplastic elastomer resin may be used.

Olefin block copolymers (OBC) or polyolefin thermoplastic elastomers (TPO) are particularly preferred. Among these, olefin block copolymers (OBC) are particularly preferred from the viewpoints of excellent heat resistance and flexibility. At least one kind of these thermoplastic elastomer resins may be used, or two or more kinds may be blended. Further, there is no particular limitation on the polymerization method of these thermoplastic elastomer resins, and examples thereof include high pressure polymerization, slurry polymerization, solution polymerization and gas phase polymerization. The polymerization catalysts are also not particularly limited, and examples thereof include Ziegler catalysts, metallocene catalysts and the like.

From the viewpoint of the excellent heat resistance, the thermoplastic elastomer resin has a melting point in the range of 150° C. or more, and a melting heat capacity of less than 30 J/g. When the melting point is less than 150° C., sufficient heat resistance may not be obtained. When the melting heat capacity is 30 J/g or more, the crystallinity increases, and thus sufficient flexibility may not be obtained. More preferably, the melting point is 160° C. or more, and the melting heat capacity is 25 J/g or less. Moreover, the temperature of crystallization is preferably 50° C. or more. More preferably, the temperature of crystallization is 60° C. or more. If the temperature of crystallization is less than 50° C., the cycle time for molding the foam may not be shortened.

The thermoplastic elastomer resin preferably used has a density of 850 to 920 kg/m$^3$ and an MFR (230° C.) in the range of 1 g/10 min or more and less than 15 g/10 min. Especially, the thermoplastic elastomer resin having a density of 860 to 910 kg/m$^3$ and an MFR (230° C.) of 5 g/10 min or more and less than 10 g/10 min is particularly preferably used. Examples of the commercially available thermoplastic elastomer resin used in the present invention include Mitsui Chemicals, Inc., "Tafmer" (registered trademark) PN-3560 and "NOTIO" (registered trademark) SN-0285 for an olefin block copolymer (OBC), and Prime Polymer Co., Ltd., "Prime TPO" (registered trademark) M142E and "Qualia" (registered trademark) CS356M for a polyolefin thermoplastic elastomer (TPO), and the like.

The foam of the present invention may be mixed with another thermoplastic resin as long as the effects of the present invention are not impaired. Examples of the thermoplastic resin herein include polyesters, polyamides, polylactic acids, polyethers, polyvinyl chloride, polyurethane, polystyrene and the like, which are conventionally known.

The thermoplastic elastomer resin is preferably contained in an amount of 10% by mass to 80% by mass in 100% by mass of the polyolefin resin composition, more preferably in an amount of 10 to 65% by mass, and most preferably in an amount of 30 to 55% by mass from the viewpoint of improved flexibility, buffer property and processability. When the thermoplastic elastomer resin is contained in an amount of less than 10% by mass, excellent flexibility and buffer property cannot be obtained, and when the thermoplastic elastomer resin is contained in an amount of more than 65% by mass, the flexibility is improved and the adequate resilience cannot be obtained upon the compression as a sealing material, causing appearance defects.

The foam of the present invention may contain a polyethylene resin. Examples of the polyethylene resins include high density polyethylene (HDPE), low density polyethylene (LDPE), linear low density polyethylene (LLDPE), ethylene-ethyl acrylate copolymers (EEA), ethylene-butyl acrylate copolymers (EBA), and the like. As necessary, copolymers of an ethylene monomer with other copolymerizable monomers can also be used. One kind of the polyethylene resins may be used alone, or two or more kinds may be used in combination. There is no particular limitation on the polymerization method of these polypropylene resins, and examples thereof include high pressure polymerization, slurry polymerization, solution polymerization and gas phase polymerization. The polymerization catalysts are also not particularly limited, and examples thereof include Ziegler catalysts, metallocene catalysts and the like.

The polyethylene resin preferably used has a density of 890 to 950 kg/m$^3$ and an MFR (190° C.) in the range of 1 g/10 min or more and less than 15 g/10 min. Especially, an ethylene-α-olefin copolymer having a density of 920 to 940 kg/m$^3$, an MFR (190° C.) of 2 g/10 min or more and less than 10 g/10 min and a melting point of 100° C. or more and less than 130° C. is particularly preferably used.

In the foam of the present invention, a first surface portion on one side in the thickness direction, a second surface portion on the other side in the thickness direction, and the inside portion of the foam are preferably formed from the same resin composition. When the composition of the resin is different in the central portion, the first surface portion and the second surface portion in the thickness direction, the difference in the shrinkage ratio on heating or in the melting point damages the appearance by wrinkles, irregularities, and the like, and thus the effect as a sealing material may not be obtained.

In the foam of the present invention, the following (Formula 1) and (Formula 2) are preferably satisfied in either or both of the first surface portion and the second surface portion:

the thickness of a pseudo skin layer≤3 μm     (Formula 1)

the thickness of a pseudo skin layer/the thickness of a cell wall inside the foam≤1.5     (Formula 2)

The "pseudo skin layer" herein indicates a layered portion with a high density and a lower foaming ratio than that of the central portion of the foam, and this portion is formed by, after the skin layer is removed, applying heat to the surface of the foam to change the shape of the cells in the vicinity of the surface. The thickness of the pseudo layer is determined by a method described later. The thickness of the cell wall is determined by a method described later.

In the case of the use as an adhesive tape coated with an adhesive, the thickness of the pseudo skin layer of 3 μm or less results in the improved tracking ability to a substrate to which the adhesive tape is adhered, and thus a tight adhesion without gaps on fine irregularities is possible. The lower limit of the thickness of the pseudo skin layer is not particularly limited as long as the (Formula 2) is satisfied.

Furthermore, the value obtained by dividing the thickness of the pseudo skin layer by the thickness of the cell wall inside the foam is preferably 1.5 or less. In the case of the use as an adhesive tape coated with an adhesive, a small thickness of the pseudo skin layer reduces the flexibility and the bending stress, and thus, the adhesion to a site with a large angle R (bending) is possible without wrinkles or breakage. From the viewpoint of the adhesion without gaps on fine irregularities, the value obtained by dividing the thickness of the pseudo skin layer by the thickness of the cell wall inside the foam is more preferably 1.3 or less. Since it is assumed that the foam of the present invention is used in a high temperature environment (in particular, 100° C. or more), a smaller difference between the thickness of the pseudo skin layer and the thickness of the film of internal cells results in a smaller difference in the shrinkage stress which is caused in a high temperature environment, and thus, a dimensional change, the lowering adhesiveness on the adhesive tape or peeling of the adhesive tape can be suppressed.

Furthermore, the (Formula 1) and the (Formula 2) are preferably satisfied in both of the first surface portion and the second surface portion.

The foam of the present invention preferably has a thickness of 80 μm to 800 μm, more preferably 80 μm to 350 μm. When the thickness is more than 350 μm, the heat insulation property and buffer property may be improved, but the foam may not be used as a sealing material when the clearance between substrates is extremely narrow, which is more remarkable when the thickness is more than 800 μm. With the thickness of less than 80 μm, the aimed heat insulation property and buffer property may decrease.

The foam of the present invention preferably has an average cell size in the length direction (MD) of 150 μm to 450 μm. When the average cell size is less than 150 μm, the number of cells per unit area increases, and the amount of air decreases due to the decreased cell size, resulting in the reduction in heat insulation property, buffer property, and the flexibility such as the 25% compression hardness or the like. When the average cell size exceeds 450 μm, the expanded cell size decreases the strength of the foam, resulting in an adhesive tape substrate which breaks easily. Thus, the appearance defects or the reduction of mass productivity may be caused.

The average cell size of the foam is obtained as follows: a foam sample piece is cut with a sharp blade such a way that the cells are not broken, and its cross section is observed with a scanning electron microscope (model: S-3000N manufactured by Hitachi, Ltd., or model: S-3400N manufactured by Hitachi High-Technologies Corporation) and photographed with a magnification of 30 to 50 times, and the inner diameter of 100 cells arbitrarily selected is measured on a straight line between two points, and the arithmetic mean value is used as the average cell size (μm).

The foam of the present invention preferably has an apparent density of 33 to 300 kg/m$^3$, more preferably 55 to 200 kg/m$^3$. The apparent density of less than 33 kg/m$^3$ results in the reduction of the strength of the foam, and defects such as tears and the like are likely to occur in the case of the use as a sealing material. The apparent density of greater than 300 kg/m$^3$ stabilizes the shape, but the flexibility, buffer property and the tracking ability may decrease.

The foam of the present invention may be either in a form of a cross-linked resin foam (referred to as a cross-linked foam) or in a form of a non-cross-linked resin foam (referred to as a non-cross-linked foam), and a suitable resin foam may be selected according to the application. However, a cross-linked foam is preferred because the surface of the resin foam is smooth, and the appearance is excellent.

When the foam of the present invention is cross-linked, in other words, when the foam of the present invention is a cross-linked foam, the gel fraction indicating the state of cross-linking is preferably in the range of 20% or more and 65% or less, and more preferably in the range of 30% or more and 50% or less. The gel fraction of less than 20% is not preferred because the gas of the blowing agent escapes from the surface during foaming, and a product having a desired foaming ratio is difficult to obtain, resulting in decreased flexibility, and increased 25% compression hardness and centerline average roughness. The gel fraction exceeding 65% produces a hard foam which shows increased surface hardness and 25% compression hardness and which is difficult to melt when heated, resulting in lowered surface smoothness and increased centerline average roughness. In addition, due to excessive cross-linking, a product having a smooth surface and a high foaming ratio may be difficult to obtain, and the moldability may decrease because the mechanical strength such as the elongation at break and the like decrease.

The foam of the present invention is a foam having closed cells. From the viewpoint of the cushioning property and heat insulation property, the closed cell ratio is preferably 80% or more, and can be made in the form of a sheet.

In the foam of the present invention, an antioxidant such as a phenolic antioxidant, a phosphorus antioxidant, an amine antioxidant, a sulfur antioxidant or the like, a metal deactivator, a filler such as mica, talc or the like, a flame retardant such as bromine flame retardant, phosphorus flame retardant or the like, a flame retardant auxiliary agent such as antimony trioxide or the like, an antistatic agent, a lubricant, a pigment, and an additive for polyolefins such as polytetrafluoroethylene or the like may be added as long as the effects of the present invention are not impaired.

The foam sheet used in the present invention may be colored as long as the effect of the invention is not impaired. As the colorant, any conventionally known pigment (carbon black, titanium oxide, and the like) may be used alone, or two or more kinds may be used in combination.

Examples of black colorants used for coloring in black include carbon black (furnace black, channel black, acetylene black, thermal black, lamp black, and the like), graphite, copper oxide, manganese dioxide, aniline black, perylene black, titanium black, cyanine black, activated carbon, ferrite (nonmagnetic ferrite, magnetic ferrite, and the like), magnetite, chromium oxide, iron oxide, molybdenum disulfide, chromium complex, complex oxide black pigment, anthraquinone organic black pigment, and the like, and any known colorant can be used. Among them, carbon black is preferred from the viewpoint of cost and availability.

One kind of the black colorants can be used alone or in combination of two or more kinds. The content of the black colorant is not particularly limited, and the use in the content of 1% by mass to 20% by mass is suitable when the mass of the foam is 100% by mass.

The amount can be adjusted suitably so that desired optical characteristics can be obtained when the foam of the present invention is used as a member of a double-sided adhesive sheet.

The surface of the foam of the present invention may be subjected to a known surface treatment. For example, chemical or physical surface treatments such as undercoating treatment, corona discharge treatment, plasma treatment and the like may be applied. More specifically, in order to enhance the adhesion property to an acrylic adhesive layer or the like, a conventional surface treatment, for example, an oxidation treatment by a chemical or physical method such as a corona discharge treatment, a chromic acid treatment, an ozone exposure, a flame exposure, a high-pressure bombardment exposure, an ionizing radiation treatment, or the like may be applied. A coating treatment by an undercoating agent, a release agent, or the like may be applied. The corona discharge treatment is preferred because the corona discharge treatment does not change the surface smoothness of the foam.

An adhesive tape can be produced by laminating an adhesive layer on at least one side of the foam of the present invention, for example, on one side or both sides of the sheet-shaped foam. The adhesive is not particularly limited, and examples thereof include acrylic adhesives, rubber adhesives (natural rubber adhesives, synthetic rubber adhesives, and the like), silicone adhesives, polyester adhesives, urethane adhesives, polyamide adhesives, epoxy adhesives, vinyl alkyl ether adhesives, fluorine adhesives and the like. The above adhesive can be used alone or in combination of two or more kinds. The above adhesive may be any agent form such as an emulsion adhesive, a solvent adhesive, a hot-melt adhesive, an oligomer adhesive, a solid adhesive or the like.

The thickness of the above adhesive layer is not specifically limited and is preferably 5 µm or more and 100 µm or less, and more preferably, 20 µm or more and 80 µm or less. As the adhesive layer, a thinner layer is preferred because the preventive effect of the adhesion of dust and dirt at an end portion is better. The adhesive layer may be a single layer or a laminate.

In the case of the use as a single-sided or double-sided adhesive tape, the foam of the present invention can be used as a sealing material or an impact absorbing material inside an information communication device, and in the case of the use as an adhesive tape used for automotive interior materials, the foam of the present invention can be used as a buffer material (protective sheet) or a masking tape which prevents rubbing of members.

The method of producing the foam of the present invention will be described below.

The foam of the present invention includes the step of producing a foam sheet having a skin layer of 3 µm or more on both top and bottom surfaces in the thickness direction; the step of slicing the foam sheet in the thickness direction, that is, on a plane parallel to a plane containing the length direction and the width direction, to produce a foam sheet not having a skin layer; and the step of heating the foam sheet subjected to slicing. The step of compressing the foam in the thickness direction can be further included.

The skin layer herein indicates a layer having a high density and an extremely low foaming ratio, generated on the surface layer portion in the process of producing a foam. In the process of producing a foam, the foaming action is often promoted by heat or actinic light from the external environment. Due to pressure applied to the surface, cells may crush, and the foaming behavior may be different from that in the inside. Thus, a skin layer is generated. The skin layer plays a role as a support layer which protects the inside, creating a good foaming state in the inside.

In the method of producing the foam of the present invention, the foam is preferably heated so that the surface temperature is within the range of (Formula 3) in the step of heating the foam sheet subjected to slicing.

$$Tm-20(°C.) \leq H \leq Tm+60(°C.) \quad \text{(Formula 3)}$$

(wherein Tm: melting point (° C.) of the resin or resin composition constituting the surface of said foam sheet, H: surface temperature (° C.) of said foam sheet).

In order to achieve both the surface smoothness and flexibility of the foam, the heating temperature is preferably not more than the temperature which is 60° C. or higher than the melting point of the resin or the resin composition constituting the surface of the foam sheet: Tm, and not less than the temperature which is 20° C. or lower than the melting point of the foam: Tm. Too a low heating temperature is not preferred because the pseudo skin layer is not sufficiently formed, resulting in the decrease in the surface smoothness. Too a high heating temperature is not preferred because the foam melts or because the density of the foam increases and the flexibility lowers. When the resin or the resin composition constituting the surface of the foam sheet has a plurality of melting points, the melting point Tm refers to the highest melting point.

In order to obtain preferred surface smoothness and flexibility, the surface temperature (° C.) of the foam at the time of heating: H is preferably Tm or more and Tm+50° C. or less.

The method of producing the foam of the present invention will be described below by way of examples.

The foam sheet of the present invention includes the step of producing a polyolefin resin foam; and the step of slicing the foam on a plane parallel to a plane containing the length direction and the width direction to produce a foam sheet. Further preferably, the step of heating the foam sheet subjected to slicing and the step of stretching and compressing the foam sheet subjected to slicing can also be included, and thus a pseudo skin layer can be formed on the surface of the foam.

First, the step of producing a foam sheet having a skin layer of 3 μm or more on the top and bottom surfaces in the thickness direction will be described.

The foam sheet used in the present invention is produced by mixing a blowing agent capable of generating gas in a mixture of polyolefin resins. Examples of the production method include: an atmospheric pressure foaming method in which a chemical blowing agent by thermal decomposition is added as a blowing agent to a mixture of polyolefin resins, and the resulting mixture is melt-kneaded and then foamed by heating under atmospheric pressure; an extrusion foaming method in which a chemical blowing agent by thermal decomposition is thermally decomposed in an extruder and the mixture of polyolefin resins is foamed while being extruded under high pressure; a press foaming method in which chemical blowing agent by thermal decomposition is thermally decomposed in a press mold and the mixture of polyolefin resins is foamed under reduced pressure; an extrusion foaming method in which a solvent which becomes gas or vaporizes is melt-kneaded in an extruder and the mixture of polyolefin resins is foamed by extrusion under high pressure.

The chemical blowing agent by thermal decomposition used herein is a chemical blowing agent which decomposes on heating to release a gas, and, examples thereof include organic blowing agents such as azodicarbonamide, N,N'-dinitrosopentamethylenetetramine, P,P'-oxybenzenesulfonyl hydrazide and the like, and inorganic blowing agents such as sodium bicarbonate, ammonium carbonate, ammonium bicarbonate and calcium azide and the like.

The blowing agent can be used alone or in combination of two or more kinds. In order to obtain a flexible foam sheet having high moldability, a smooth surface and high ratio, an atmospheric pressure foaming method in which azodicarbonamide is used as a blowing agent is suitably applied.

The method of cross-linking a foam sheet used in the present invention is not particularly limited. Examples of the methods of obtaining a cross-linked foam sheet include a chemical cross-linking method in which cross-linking is performed chemically by a crosslinker which has a chemical structure such as a silane group, a peroxide, a hydroxyl group, an amide group, an ester group or the like and which is contained in raw materials; and a radiation cross-linking method in which cross-linking is performed by irradiation of an electron beam, an α ray, a β ray, a γ ray, or an ultraviolet ray on the polyolefin resin.

In the foam sheet used in the present invention, when the construction of a cross-linked structure by electron beam cross-linking is difficult, a crosslinking agent may be contained in raw materials for producing the foam sheet. Thus, a cross-linked foam sheet can be obtained by an electron beam. The crosslinking agent is not particularly limited, but a polyfunctional monomer is preferably used. Examples of polyfunctional monomers which can be used include divinylbenzene, trimethylolpropane trimethacrylate, 1,6-hexanediol dimethacrylate, 1,9-nonanediol dimethacrylate, 1,10-decanediol dimethacrylate, trimellitic acid triallyl ester, triallyl isocyanurate, ethyl vinyl benzene and the like. These polyfunctional monomers may be used alone or in combination of two or more kinds.

The foam sheet described above is obtained as follows: a blowing agent by thermal decomposition such as azodicarbonamide or the like is added to a polypropylene resin, a thermoplastic elastomer resin, and a polyethylene resin, and the mixture is uniformly mixed using a mixing device such as a Henschel mixer, a tumbler or the like, then uniformly melt-kneaded in a melt-kneading machine such as an extruder, a pressure kneader or the like at a temperature lower than the decomposition temperature of the blowing agent by thermal decomposition, and the resulting mixture is formed into a sheet shape with a T-die and then cross-linked by the irradiation of an ionizing radiation.

Then, the obtained sheet-shaped product is heated to a temperature which is equal to or higher than the decomposition temperature of the blowing agent by thermal decomposition by a method of floating the obtained sheet-shaped product on a salt-bath serving as a heat medium or a method of placing the obtained sheet-shaped product into an atmosphere such as hot air or the like, and then the obtained sheet-shaped product is foamed due to the gas generated by the decomposition. A foam sheet used in the present invention can be thus obtained.

Any other conventionally known methods of producing the foam sheet may be used. For example, a polypropylene resin, a thermoplastic elastomer, and a polyethylene resin are added and mixed with talc as a cell nucleating material to prepare a resin composition, which is then supplied to a first extruder of a tandem extruder with two stages arranged in parallel and melt-kneaded; carbon dioxide gas (carbon dioxide) in a supercritical state is injected as a blowing agent from the middle of the first extruder, and the resin composition in the melt state and the carbon dioxide are uniformly mixed and kneaded; the molten resin composition containing the blowing agent is continuously supplied to the second extruder, melt-kneaded and cooled to a resin temperature which is suitable for foaming; and then the extrusion foaming is carried out, and a cylindrical foam from a circular-die of a mold attached to the tip of the second extruder is cut from one point with a cutter; and thus a foam sheet can be obtained.

As an another example, a blowing agent by thermal decomposition such as thermally expandable microcapsules or the like is added to a polypropylene resin, a thermoplastic elastomer resin, and a polyethylene resin, and the resulting mixture is uniformly mixed using a mixing device such as a Henschel mixer, a tumbler or the like, and in an extruder connected with a T-die, a foam is discharged from the T-die which is heated at a temperature which is equal to or more than the decomposition temperature of the blowing agent by thermal decomposition, and the discharged foam is stretched by a calender roll under cooling. Thus a long foam sheet can be obtained.

The foam sheet produced in this way often has a skin layer on both the top and bottom surfaces usually in the thickness direction, and therefore, the surface hardness and the bending stress of the skin layer is higher than the inside portion of the foam, causing a problem of the decrease in the tracking ability to the substrate and the flexibility. In order to solve this problem, the skin layers on both the top and bottom surfaces in the thickness direction are preferably removed to obtain a pseudo skin on the foam by heating a sliced surface having suitable surface hardness and substrate tracking ability. This will be described in detail below.

The thickness of the skin layer of the foam varies depending on various production methods and conditions of the foam as described above, but the thickness of the skin layer is generally 3 µm or more.

In the present invention, the skin layer is a layer which is generated on the top surface and the bottom surface during the production of a foam sheet and which has a high density, and this skin layer is an unfoamed portion, or a portion containing a lot of portions with an extremely low foaming ratio compared to the central portion in the thickness direction. In the skin layer, a cell structure almost does not exist, or even if the cell structure is present, the foaming ratio is small. Therefore, most of the skin layer is composed of the unfoamed portions of the resin. Thus, the presence of the skin layer leads to the reduction of the tracking ability to the substrate and the flexibility as described above. The thickness of the skin layer of 50 µm or more is not preferred because the flexibility of the foam is reduced. The thickness of the skin layer of 2 µm or less is not preferred either because the surface smoothness of the foam is reduced.

The step of slicing the foam sheet in the thickness direction to prepare a foam sheet not having a skin layer will be described.

The device for slicing the foam sheet may be any device capable of slicing industrial soft materials and rubber sheets. For example, "NP-120RS" manufactured by NIPPY KIKAI CO., LTD. can be used. Further, any polishing machines for a foam which are generally used may be used, such as a belt sander polishing machine, a router polishing machine, CMP (chemical mechanical polishing) in which chemical actions are combined with mechanical polishing, and the like.

One example of a method of removing skin layers from the foam sheet is as follows: a foam sheet is prepared which is slightly thicker than the thickness set for each application, and the top and bottom skin layers sandwiching the foam in the thickness direction are sliced or polished and thus removed. As a result, a foam sheet without a skin layer which comprises a sliced surface and a polished surface on which a cell wall has been broken.

The step of heating the foam sheet subjected to slicing will be described.

As described above, because of the skin layers on both the top and bottom surfaces of the foam, the foam has a problem of decreased tracking ability to the substrate and decreased flexibility. If the skin layers of the foam are removed in order to prevent this, cross section of the cell is exposed, which lowers the surface smoothness and the like.

In the present invention, in order to prevent this, the sliced surface is thermally treated to produce a pseudo skin layer. Moreover, by applying a thermal treatment to the sliced surface which is uneven due to the cells exposed, the surface of the foam can be made smooth. The heating method is not particularly limited as long as it is a known method such as a heater, hot air, or the like.

The heating temperature is not particularly limited, but too a low heating temperature is not preferred because the pseudo skin layer is not sufficiently formed, resulting in the decrease in the surface smoothness. Too a high heating temperature is not preferred either because the foam melts or because the density of the foam increases and the flexibility lowers. Moreover, the foam is preferably stretched in the length direction (MD) upon heating. More preferably, the foam is stretched at a stretch ratio of 110% or more when heated because the sliced cell wall melts and the molten surface becomes smooth. In addition, "when heated" means that heating and stretching may be simultaneous, sequential, or combined, and there is no particular limitation. If the sliced surface does not melt when heated, there is no pseudo skin, and fragments of the cell wall remain, which worsens the appearance. With the stretch ratio of 110% or less, the foam cannot be thinned, and the cell shape cannot be controlled. In the case of the thermal stretching as described above, a foam can be obtained by any method of stretching in the length direction (MD), in the width direction (TD), and simultaneous stretching in the length direction (MD) and the width direction (TD). On the other hand, stretching by 250% or more is not preferred because the thermal dimensional change of the obtained foam becomes large.

In the foam of the present invention, the foam sheet subjected to slicing may be compressed in the thickness direction as necessary. By compressing the foam sheet, the foam sheet can be made thinner and the surface of the pseudo skin layer can be made further smooth. The compression of the foam sheet may be performed prior to heating or after heating or simultaneously with heating. Any conventionally known method of compression may be used, such as a method of sandwiching the foam sheet with driven rolls, a method of sandwiching the foam sheet with press plates, or the like. Thus, the surface smoothness of the foam can be improved by foaming the surface with a roll or the like after heating. In order to set the centerline average roughness to 20 µm or less, the centerline average roughness of the rolls or the press plates is preferably 15 µm or less. When the rolls or press plates are too smooth, the foam adheres thereto and thus the productivity decreases. Therefore, the centerline average roughness is preferably 1 µm or more.

When the resin composition having the above-described composition is used, it is possible to easily form a specific surface portion by a thermal stretching treatment and to obtain a foam exhibiting appropriate flexibility and surface hardness. In addition, by melting the surface of the foam, it is possible to control the state of the cells on the surface outside the surface portion, surface condition and exposed cell wall. In addition, by a thermal compression treatment, the foam sheet can be further made thinner with flattened cells, and the force of resilience under a load can be also reduced.

As described above, the pseudo skin layers obtained by removing the skin layers and heating the resulting sliced surfaces, for example, are thinner than the skin layers, and cells in the thickness direction can be flattened by stretching, compression, or the like. As a result, the surface smoothness can be provided without any decrease in the tracking ability to the substrate and flexibility.

EXAMPLES

The evaluation methods used in the following Examples and Comparative Examples are as follows.

(1) Density of the Polyolefin Resins:

The density of a polyolefin resin was measured according to JIS K7112 (1999) "Plastics—Methods of Determining the Density and Relative Density of Non-cellular Plastics".

(2) MFR:

For the MFR, according to Annex B (reference) "Specified Standards and Test Conditions of Thermoplastic Materials" in JIS K 7210 (1999) "Plastics-Testing Methods of Melt Mass Flow Rate (MFR) and Melt Volume Flow Rate (MVR) of Thermoplastics," under the conditions of a temperature of 190° C. with a load of 2.16 kgf for the polyethylene resin (a2) and of a temperature of 230° C. with a load of 2.16 kgf for the polypropylene resin (a1) and the thermoplastic elastomer resin (a3), a melt mass flow rate meter (Melt Indexer F-B01 manufactured by Toyo Seiki Seisaku-sho, Ltd.) was used and a manual cutting method was applied to measure the weight of the resin generated from the die in 10 minutes.

(3) Melting Point of the Resin Constituting the Foam and Melting Point of the Foam:

The melting point is the maximum temperature obtained from the endothermic peak of the DSC curve in which the melting heat capacity (J/g) is taken along the vertical axis and the temperature is taken along the horizontal axis after the differential scanning calorimetric analysis. Two milligrams of a sample was prepared and measured in a nitrogen environment using a differential scanning calorimeter (DSC: RDC220-robot DSC manufactured by Seiko Instruments & Electronics Ltd.). The measurement conditions are as follows: the sample was heated to a temperature of 200° C. and melted; the exothermic peak obtained when the sample was then cooled at a rate of 10° C./min to a temperature of −100° C. corresponds to the temperature of crystallization; the sample was further cooled, and the middle point of the step transition points corresponds to the glass transition temperature. Then, the sample was heated at a rate of 10° C./min to measure an endothermic peak per unit mass. The summit of the endothermic peak due to melting obtained at the second temperature rise was taken as the melting point.

The method of measuring the melting point of the foam of the present invention is also the same as the method described above. When a foam is produced from a plurality of resins, among the endothermic peaks obtained at the second temperature rise, the lowest one is taken as the first melting point, and it goes on sequentially.

(4) Foam Thickness:

The thickness of the foam corresponds to a value measured in accordance with ISO 1923 (1981) "Cellular plastics and rubbers—Determination of linear dimensions". Specifically, using a dial gauge with a circular probe having an area of 10 cm², a piece of the foam cut into a certain size is placed still on a flat table, and a constant pressure of 10 g is applied from the top on the surface of the foam for the measurement.

(5) Apparent Density of the Foam:

The apparent density of the foam corresponds to a value measured and calculated according to JIS K 6767 (1999) "Cellular plastics—Polyethylene—Methods of test". The thickness of the foam cut into a 10 cm square is measured and the mass of this test piece is also weighed. The apparent density is the value obtained by the following equation, in which the unit is kg/m³.

Apparent density (kg/m³)={mass of the test piece (kg)/ area of the test piece 0.01 (m²)/thickness of the test piece (m)}

(6) Gel Fraction of Foam:

The foam is cut into a square of about 0.5 mm, and the approximate amount of 100 mg is weighed to the nearest 0.1 mg. After the immersion in 200 ml of tetralin at a temperature of 140° C. for 3 hours, the solution was naturally filtered with a 100-mesh stainless steel wire mesh, and the insoluble substance on the wire mesh is dried in a hot air oven at 120° C. for 1 hour. Then, the resulting substance is cooled for 30 minutes in a desiccator containing silica gel, and the mass of this insoluble substance is accurately weighed, and the gel fraction of the foam is calculated in percentage according to the following equation.

Gel fraction (%)={mass of insoluble substance (mg)/ mass of foam weighed (mg)}×100.

(7) Method of Measuring Thermal Shrinkage Rate of Foam:

The method of measuring the thermal shrinkage rate of the foam is carried out according to JIS K 6767 (1999) "Cellular plastics—Polyethylene—Methods of test". Specifically, a test piece with marked lines of a 100 mm square is left for 60 minutes in a hot air oven adjusted to 100° C.; the test piece is allowed to cool in an environment of 23° C. for 60 minutes or more; and then the decrease in the gap between the marked lines in the length direction (MD) and in the width direction (TD) is divided by the original distance between marked lines which is 100 mm, and the value is expressed as a percentage.

(8) 25% Compression Hardness of Foam:

The 25% compression hardness of the foam corresponds to a value measured according to JIS K 6767 (1999) "Cellular plastics—Polyethylene—Methods of test". Specifically, the foam is cut into a size of 50 mm (the length direction (MD))×50 mm (the width direction (TD)), and the pieces are stacked so that the thickness will be 20 mm or more and 30 mm or less, and the initial thickness is measured. The sample is placed on a flat plate and compressed at a speed of 10 mm/min; the compression is stopped at a thickness equivalent to 25% of the initial thickness of the foam, and the load is measured 20 seconds later. The 25% compression hardness of the foam (kPa) was calculated according to the following equation. 25% compression hardness (kPa)=load after 25% compression and 20 seconds later (N)/25 (cm²)/10.

(9) Measurement of Thickness of Skin Layer:

For the skin layer thickness, a sample was cut with a sharp blade such a way that the cells would not be broken, and the vertical cross section thus cut out was observed with a magnification of 100 to 150 times using an optical microscope, model: VHS-900F manufactured by Keyence Corporation. The thickness of a portion of the foam where the cell portion was absent was measured. The arithmetic·mean value of 5 points selected arbitrarily was taken as the skin layer thickness.

(10) Thickness of Pseudo Skin Layer, Thickness of Cell Wall Inside Foam:

For the thickness of the pseudo skin layer and the thickness of the cell wall inside the foam, a sample was cut with a sharp blade such a way that the cells would not be broken, and the vertical cross section thus cut out was observed on a scanning electron microscope (SEM) (model: S-3000N manufactured by Hitachi High-Technologies Corporation, Ltd.) with a magnification of 100 to 150 times, and the obtained image and measurement software were used to measure each of the thickness of the pseudo skin layer and the thickness of the cell wall. In the range of 1.5 mm×1.5 mm of the photographed image, a surface directly heated after the slicing was measured for the pseudo skin layer, and a cell wall near the center of the sample excluding the pseudo skin layer was measured for the thickness of the internal cell wall. For each, 10 sites were measured, and the arithmetic mean was obtained.

(11) Measurement of Surface Hardness of Foam:

The surface hardness was measured, using "Micro Rubber Hardness Tester MD-1 capa Type C" manufactured by KOBUNSHI KEIKI CO., LTD., which can measure a thin and soft object. The measurement was carried out five times. The upper and lower limit values were excluded and the average value of the three values was used. The measurement conditions were as follows: using a hemispherical probe with a pressurized surface of $\varphi$ 9 mm and a pressing needle of $\varphi$ 1 mm, the needle was lowered from the height of 0.5 mm at a speed of 3 mm/sec.

(11) Measurement of Surface Roughness of Foam (Centerline Average Roughness Ra 75):

Using a centerline average roughness Ra75 defined in JIS B0601 (2001), the surface roughness was measured three times and the arithmetic mean value was used.

(Evaluation Method)

The evaluation methods used in Examples and Comparative Examples are as follows.

(1) Tracking Ability

The evaluation of the tracking ability was performed by the following method. The four sides of a foam sample of a 1 m square were clamped and brought into contact with a cylindrical mold (diameter of 50 mm $\varphi$×height of 50 mm) at a normal temperature.

○: The sample tracked the cylinder without a gap between the top surface of the cylinder and the sample.

Δ: A slight gap was present between the top surface of the cylinder and the sample, but the corners tracked the cylinder.

×: A gap was present between the top surface of the cylinder and the sample, and the corners did not track the cylinder.

(2) Cushioning Property

The evaluation of the cushioning property was carried out by the following method. The foams were laminated on an iron plate to a thickness of 10 mm. After that, the upper portion of the foams was pressed with a finger and thus the cushioning property was evaluated.

○: The finger sinks and sufficient resilience is present.

Δ: The finger sinks insufficiently, or no resilience is present.

×: Hardness is present.

(3) Adhesive Strength Difference

The adhesive strength difference was measured by the following method. An adhesive was applied to both sides of the foam, and each surface was attached to a SUS plate, and then peeled off by hand for the evaluation.

○: There is no difference in strength between the two sides.

Δ: There is a difference in strength between the two sides.

(4) Adhesive Processability

The adhesive processability was measured by the following method. An adhesive was applied to the surface of a foam, and then the surface was observed.

○: An adhesive layer is sufficiently maintained on the surface.

Δ: An adhesive layer is formed on the surface, but the layer is thin. However, if the application amount is increased, the layer is maintained.

×: The formation of an adhesive layer is insufficient.

(5) Heat Resistance

The heat resistance was evaluated by the following method. Four sides of a 1 m square foam were clamped and held for 30 seconds in a molding machine at 200° C., and evaluated for the properties on the surface.

○: There is no problem in the properties on the surface and the surface is beautiful.

Δ: Unevenness is slightly observed on the surface.

>: The surface becomes rough and the unevenness gets severe.

(6) Comprehensive Evaluation

The comprehensive evaluation was conducted based on the results of the tracking ability, cushioning property, adhesive strength difference, adhesive processability and heat resistance.

●: There is no ×, and the number of Δ is up to one

○: There is no ×, and the number of Δ is up to two

Δ: The number of × is up to two

×: The number of × is three or more.

(Used Resin)

The resins used in Examples and Comparative Examples are as follows.

<Thermoplastic Elastomer Resin> a-1: "Tafmer" (registered trademark) PN-3560 manufactured by Mitsui Chemicals, Inc., Density of 866 kg/m$^3$, MFR (230° C.)=6.0 g/10 min, melting point=160° C., temperature of crystallization=60° C., glass transition temperature=−25° C., crystal melting energy=23 J/g a-2: "Prime TPO" (registered trademark) M142E, manufactured by Prime Polymer Co., Ltd.

Density of 900 kg/m$^3$, MFR (230° C.)=10.0 g/10 min, melting point=153° C., temperature of crystallization=80° C., glass transition temperature=−23° C., crystal melting energy=29 J/g a-3: "INFUSE" (registered trademark) 9107, Dow Chemical Company Density of 866 kg/m$^3$, MFR (230° C.)=3.0 g/10 min, melting point=121° C., temperature of crystallization=95° C., glass transition temperature=−62° C., crystal melting energy=15 J/g <Polypropylene Resin> b-1: "Prime Polypro" (registered trademark) J452HAP, Prime Polymer Co., Ltd. Density of 900 kg/m$^3$, MFR (230° C.)=3.5 g/10 min, melting point=163° C.

b-2: "Novatec" (registered trademark) PP EG6D manufactured by Japan Polypropylene Corporation Density of 900 kg/m$^3$, MFR (230° C.)=0.8 g/10 min, melting point=146° C.

<Polyethylene Resin> c-1: "Novatec" (registered trademark) LL UJ960 manufactured by Japan Polyethylene Corporation Density of 935 kg/m$^3$, MFR (190° C.)=5 g/10 min, melting point=126° C.

c-2: "Novatec" (registered trademark) LD LJ602 manufactured by Japan Polyethylene Corporation Density of 922 kg/m$^3$, MFR (190° C.)=5.3 g/10 min, melting point=113° C.

<Ethylene Vinyl Acetate Copolymer Resin>

EVA: "Ultrasen" (registered trademark) 636 by Tosoh Corporation

Density of 941 kg/m$^3$, MFR (190° C.)=2.5 g/10 min, melting point=82° C.

Blowing agent: azodicarbonamide "Vinyfor AC # R" (registered trademark) manufactured by EIWA CHEMICAL IND. CO., LTD.

Crosslinking agent: 55% divinylbenzene manufactured by Wako Pure Chemical Industries, Ltd Antioxidant: "IRGANOX" (registered trademark) 1010 manufactured by BASF (Processing Methods)

The processing methods used in Examples and Comparative Examples are as follows:

(1) Slicing Step

The slicing step is a step of cutting the foam into two or more pieces in the thickness direction, which was performed by a rotating band saw.

(2) Heating Step

Heating step is a step of heating both sides of the foam by a heater which can heat the foam to 200° C. or more. An infrared heater was used.

(3) Stretching Step

Stretching step is a step of stretching the foam by using different speeds between in unwinding and in winding. The foam was stretched in the longitudinal direction by controlling the speed of the driving nip rolls.

(4) Compressing Step

Compression step is a step of compressing and rolling the foam in the thickness direction. Compression was achieved by narrowing the gap between the nip rolls so that the gap between the nip rolls would be smaller than the thickness of the original foam.

Examples 1 to 22

Comparative Examples 1 to 4

The foams produced in Examples 1 to 22 and Comparative Examples 1 to 4 are as follows.

The thermoplastic elastomer resin, the polypropylene resin, the polyethylene resin, the blowing agent, the crosslinking agent and the antioxidant as shown in Tables were mixed in the respective proportions in a Henschel mixer, and the resulting mixture was melt-extruded at a temperature of 160 to 180° C. using a twin screw extruder. Using a T-die, a polyolefin resin sheet having a thickness of ½ or more of a target foam thickness was prepared. In Tables, the blending amounts of the blowing agent, the crosslinking agent and the antioxidant are expressed in parts by mass with respect to 100 parts by mass of the subtotal of the resin. The polyolefin resin sheet thus obtained was irradiated on one side with an electron beam at an accelerating voltage of 600 kV and in a certain absorption dose to obtain a cross-linked sheet. This cross-linked sheet was floated on a salt-bath at a temperature of 210° C. and heated from the top with an infrared heater for foaming. The foam was cooled with water at a temperature of 40° C., and the foam surface was rinsed with water and dried. Thus, a long roll foam having a thickness of 1.0 to 3.0 mm, an apparent density of 30 to 350 kg/m$^3$, and a gel fraction of 35 to 55% was obtained. The obtained long roll-like foam was sliced in the length direction (MD) from the first surface portion on one side of the foam with a slicing machine "NP-120RS" manufactured by NIPPY KIKAI CO., LTD. to produce 3 to 5 slices having a thickness of 300 μm to 800 μm. Thus, sliced foams having a skin layer on one side and long roll-like foams without a skin layer which were sliced on the top and bottom surfaces. The long roll-like foam sliced on the top and bottom surfaces and not having a skin layer was heated on the top and bottom surfaces at 140° C. to 195° C. using an infrared heater and stretched by 105% to 150% in the length direction (MD). Thus, a foam having a thickness of 100 μm to 750 μm and pseudo skin layers heated on both sides of the top and bottom surfaces in the thickness direction was prepared.

TABLE 1

| | Item | | | Example 1 | Example 2 | Example 3 | Example 4 | Example 5 | Example 6 | Example 7 |
|---|---|---|---|---|---|---|---|---|---|---|
| Composition | Thermoplastic elastomer | Type | | a-1 | a-1 | a-1 | a-1 | a-1 | a-1 | a-2 |
| | | Composition ratio | % by mass | 50 | 40 | 60 | 50 | 45 | 70 | 70 |
| | Polypropylene resin | Type | | b-1 | b-1 | b-1 | b-1 | b-2 | b-1 | b-1 |
| | | Composition ratio | % by mass | 30 | 40 | 15 | 50 | 45 | 20 | 20 |
| | Polyethylene resin | Type | | c-1 | c-1 | c-1 | — | c-1 | c-1 | c-1 |
| | | Composition ratio | % by mass | 20 | 20 | 25 | — | 10 | 10 | 10 |
| | Resin subtotal | | % by mass | 100 | 100 | 100 | 100 | 100 | 100 | 100 |
| | Blowing agent | Composition ratio | Parts by mass | 8 | 9 | 8 | 5 | 9 | 4 | 7 |
| | Crosslinking agent | Composition ratio | Parts by mass | 5 | 5 | 5 | 5 | 3 | 3 | 5 |
| | Antioxidant | Composition ratio | Parts by mass | 2 | 2 | 2 | 2 | 2 | 2 | 2 |
| | Foam thickness | | μm | 340 | 210 | 450 | 280 | 120 | 330 | 320 |
| | Apparent density | | kg/m$^3$ | 83 | 67 | 66 | 160 | 54 | 130 | 65 |
| | Gel fraction | | % | 38 | 52 | 43 | 51 | 32 | 36 | 47 |
| | Thermal shrinkage rate | MD | % | −9 | −13 | −12 | −8 | −15 | −14 | −17 |
| | | TD | | −6 | −9 | −10 | −9 | −13 | −11 | −15 |
| | 25% compression hardness | | kPa | 33 | 40 | 30 | 49 | 26 | 42 | 16 |
| | Endothermic peak | First | ° C. | 122 | 122 | 124 | — | 121 | 120 | 119 |
| | | Second | | 153 | 154 | 152 | 156 | 153 | 149 | 148 |
| | Melting heat capacity | | J/g | 27 | 45 | 25 | 29 | 32 | 31 | 28 |
| | Skin layer thickness before slicing step | | μm | 6 | 5 | 5 | 3 | 5 | 6 | 3 |
| | Thickness of pseudo skin layer on first surface side (A) | | μm | 2.7 | 2.3 | 2.0 | 2.8 | 1.9 | 2.8 | 2.9 |
| | Thickness of pseudo skin layer on second surface side (B) | | μm | 2.4 | 2.1 | 2.1 | 2.7 | 2.0 | 2.7 | 3.1 |

TABLE 1-continued

| | Item | | | Example 1 | Example 2 | Example 3 | Example 4 | Example 5 | Example 6 | Example 7 |
|---|---|---|---|---|---|---|---|---|---|---|
| | Cell wall thickness inside foam (L) | | μm | 2.0 | 1.9 | 2.0 | 2.5 | 1.7 | 2.6 | 2.1 |
| | A/L | | — | 1.35 | 1.21 | 1.00 | 1.12 | 1.12 | 1.08 | 1.38 |
| | B/L | | — | 1.20 | 1.11 | 1.05 | 1.08 | 1.18 | 1.04 | 1.48 |
| | Surface hardness | | ° | 41 | 46 | 32 | 63 | 31 | 56 | 32 |
| | Centerline surface roughness Ra75 | First surface portion | μm | 10 | 9 | 10 | 15 | 10 | 7 | 14 |
| | | Second surface portion | | 8 | 10 | 10 | 11 | 10 | 10 | 12 |
| | Material identity | | | ○ | ○ | ○ | ○ | ○ | ○ | ○ |
| Processing method | Slicing step | Included/Not included | | Included | Included | Included | Included | Included | Included | Included |
| | Heating step | Included/Not included | | Included | Included | Included | Included | Included | Included | Included |
| | | Heating temperature | ° C. | 188 | 187 | 185 | 191 | 186 | 142 | 181 |
| | Stretching step | Included/Not included | | Included | Included | Included | Included | Included | Included | Included |
| | | Stretching ratio | % | 125 | 150 | 150 | 135 | 200 | 150 | 180 |
| | Compressing step | Included/Not included | | Included | Included | Included | Included | Included | Included | Included |
| Evaluation item | Tracking ability | | | ○ | ○ | ○ | ○ | ○ | ○ | ○ |
| | Cushioning property | | | ○ | ○ | ○ | Δ | ○ | ○ | ○ |
| | Adhesive strength difference | | | ○ | ○ | ○ | ○ | ○ | ○ | ○ |
| | Adhesive processability | | | ○ | ○ | ○ | ○ | ○ | Δ | Δ |
| | Heat resistance | | | ○ | ○ | Δ | ○ | Δ | ○ | Δ |
| | Comprehensive evaluation | | | ● | ● | ● | ● | ● | ● | ○ |

TABLE 2

| | Item | | | Example 8 | Example 9 | Example 10 | Example 11 | Example 12 | Example 13 | Example 14 |
|---|---|---|---|---|---|---|---|---|---|---|
| Composition | Thermoplastic elastomer | Type | | a-1 | a-2 | a-1 | a-1 | a-2 | a-1 | a-3 |
| | | Composition ratio | % by mass | 20 | 40 | 15 | 40 | 70 | 55 | 65 |
| | Polypropylene resin | Type | | b-1 | b-2 | b-1 | b-1 | b-1 | b-1 | b-1 |
| | | Composition ratio | % by mass | 75 | 40 | 75 | 40 | 20 | 30 | 25 |
| | Polyethylene resin | Type | | c-2 | c-1 | c-1 | EVA | c-1 | c-1 | c-1 |
| | | Composition ratio | % by mass | 5 | 20 | 10 | 20 | 10 | 15 | 10 |
| | Resin subtotal | | % by mass | 100 | 100 | 100 | 100 | 100 | 100 | 100 |
| | Blowing agent | Composition ratio | Parts by mass | 9 | 10 | 7 | 11 | 5 | 8 | 13 |
| | Crosslinking agent | Composition ratio | Parts by mass | 5 | 6 | 5 | 5 | 5 | 5 | 3 |
| | Antioxidant | Composition ratio | Parts by mass | 2 | 2 | 2 | 2 | 2 | 2 | 2 |
| | Foam thickness | | μm | 550 | 710 | 700 | 500 | 1200 | 480 | 610 |
| | Apparent density | | kg/m³ | 64 | 45 | 86 | 44 | 200 | 154 | 36 |
| | Gel fraction | | % | 33 | 54 | 45 | 55 | 50 | 51 | 33 |
| Thermal shrinkage rate | MD | | % | −12 | −12 | −5 | −22 | −15 | −17 | −14 |
| | TD | | | −11 | −9 | −7 | −18 | −14 | −14 | −13 |
| | 25% compression hardness | | kPa | 56 | 39 | 65 | 30 | 35 | 46 | 35 |
| Endothermic peak | First | | ° C. | 117 | 122 | 123 | 85 | 121 | 123 | 121 |
| | Second | | | 154 | 135 | 155 | 155 | 147 | 151 | 151 |
| | Melting heat capacity | | J/g | 68 | 46 | 70 | 38 | 29 | 32 | 29 |
| | Skin layer thickness before slicing step | | μm | 5 | 6 | 7 | 6 | 4 | 5 | 4 |
| | Thickness of pseudo skin layer on first surface side (A) | | μm | 1.8 | 3.8 | 3.2 | 3.8 | — | — | 4.1 |
| | Thickness of pseudo skin layer on second surface side (B) | | μm | 1.7 | 4.1 | 2.9 | 4.1 | — | — | 3.9 |
| | Cell wall thickness inside foam (L) | | μm | 1.4 | 2.6 | 2.5 | 3.4 | 3.1 | 2.9 | 3.1 |
| | A/L | | — | 1.29 | 1.46 | 1.28 | 1.12 | — | — | 1.32 |
| | B/L | | — | 1.21 | 1.58 | 1.16 | 1.21 | — | — | 1.26 |
| | Surface hardness | | ° | 66 | 45 | 67 | 29 | 34 | 41 | 38 |
| | Centerline surface roughness Ra75 | First surface portion | μm | 8 | 11 | 14 | 12 | 7 | 13 | 17 |
| | | Second surface portion | | 10 | 10 | 12 | 10 | 5 | 15 | 18 |

TABLE 2-continued

| | Item | | Example 8 | Example 9 | Example 10 | Example 11 | Example 12 | Example 13 | Example 14 |
|---|---|---|---|---|---|---|---|---|---|
| Processing method | Material identity | | ◯ | ◯ | ◯ | ◯ | ◯ | ◯ | ◯ |
| | Slicing step | Included/Not included | Included | Included | Included | Included | Not included | Not included | Included |
| | Heating step | Included/Not included | Included | Included | Included | Included | Included | Not included | Not included |
| | | Heating temperature °C. | 187 | 168 | 188 | 145 | 180 | — | — |
| | Stretching step | Included/Not included | Included | Included | Included | Included | Included | Included | Included |
| | | Stretching ratio % | 150 | 150 | 110 | 150 | 110 | 140 | 105 |
| | Compressing step | Included/Not included | Included | Included | Included | Included | Included | Included | Not included |
| Evaluation item | Tracking ability | | Δ | Δ | Δ | ◯ | Δ | Δ | Δ |
| | Cushioning property | | Δ | ◯ | Δ | ◯ | ◯ | Δ | ◯ |
| | Adhesive strength difference | | ◯ | ◯ | ◯ | ◯ | X | X | ◯ |
| | Adhesive processability | | ◯ | ◯ | ◯ | Δ | ◯ | ◯ | X |
| | Heat resistance | | ◯ | Δ | ◯ | X | Δ | Δ | Δ |
| | Comprehensive evaluation | | ◯ | ◯ | ◯ | Δ | Δ | Δ | Δ |

TABLE 3

| | Item | | | Example 15 | Example 16 | Example 17 | Example 18 | Example 19 | Example 20 | Example 21 |
|---|---|---|---|---|---|---|---|---|---|---|
| Composition | Thermoplastic elastomer | Type | | a-3 | a-3 | a-1 | a-1 | a-1 | a-1 | a-1 |
| | | Composition ratio | % by mass | 30 | 15 | 30 | 65 | 20 | 25 | 5 |
| | Polypropylene resin | Type | | b-1 | b-1 | b-1 | b-1 | b-1 | b-1 | b-2 |
| | | Composition ratio | % by mass | 55 | 75 | 60 | 20 | 75 | 65 | 75 |
| | Polyethylene resin | Type | | c-1 | c-1 | c-2 | c-1 | c-1 | c-1 | c-2 |
| | | Composition ratio | % by mass | 15 | 10 | 10 | 15 | 5 | 10 | 20 |
| | Resin subtotal | | % by mass | 100 | 100 | 100 | 100 | 100 | 100 | 100 |
| | Blowing agent | Composition ratio | Parts by mass | 12 | 8 | 13 | 4 | 6 | 9 | 7 |
| | Crosslinking agent | Composition ratio | Parts by mass | 3 | 5 | 3 | 5 | 6 | 6 | 3 |
| | Antioxidant | Composition ratio | Parts by mass | 2 | 2 | 2 | 2 | 2 | 2 | 2 |
| | Foam thickness | | μm | 550 | 380 | 1250 | 1100 | 2700 | 560 | 2500 |
| | Apparent density | | kg/m³ | 32 | 76 | 26 | 220 | 90 | 51 | 80 |
| | Gel fraction | | % | 33 | 32 | 43 | 51 | 49 | 43 | 44 |
| | Thermal shrinkage rate | MD | % | −13 | −10 | −8 | −14 | −8 | −10 | −5 |
| | | TD | | −12 | −9 | −6 | −13 | −7 | −5 | −5 |
| | 25% compression hardness | | kPa | 64 | 53 | 33 | 85 | 75 | 61 | 80 |
| | Endothermic peak | First | °C. | 123 | 122 | 119 | 122 | 120 | 121 | 119 |
| | | Second | | 154 | 155 | 155 | 146 | 157 | 153 | 139 |
| | Melting heat capacity | | J/g | 33 | 60 | 30 | 31 | 65 | 59 | 81 |
| | Skin layer thickness before slicing step | | μm | 6 | 4 | 7 | 7 | 8 | 6 | 8 |
| | Thickness of pseudo skin layer on first surface side (A) | | μm | 6.1 | 5.1 | — | — | — | — | — |
| | Thickness of pseudo skin layer on second surface side (B) | | μm | 6.3 | 5.4 | — | — | — | — | — |
| | Cell wall thickness inside foam (L) | | μm | 3.8 | 3.2 | 3.8 | 2.9 | 4.2 | 3.8 | 4.4 |
| | A/L | | | 1.61 | 1.59 | — | — | — | — | — |
| | B/L | | | 1.66 | 1.69 | — | — | — | — | — |
| | Surface hardness | | ° | 57 | 69 | 35 | 69 | 69 | 66 | 70 |
| | Centerline surface roughness Ra75 | First surface portion | μm | 15 | 19 | 7 | 8 | 8 | 6 | 7 |
| | | Second surface portion | | 19 | 16 | 13 | 18 | 9 | 7 | 8 |
| Processing method | Material identity | | | ◯ | ◯ | ◯ | ◯ | ◯ | ◯ | ◯ |
| | Slicing step | Included/Not included | | Included | Included | Not included | Not included | Not included | Not included | Not included |
| | Heating step | Included/Not included | | Not included | Not included | Not included | Included | Included | Included | Not included |

TABLE 3-continued

| | Item | | Example 15 | Example 16 | Example 17 | Example 18 | Example 19 | Example 20 | Example 21 |
|---|---|---|---|---|---|---|---|---|---|
| | | Heating temperature °C. | — | — | — | 179 | 190 | 186 | — |
| | Stretching step | Included/Not included | Not included | Included | Not included | Included | Included | Included | Not included |
| | | Stretching ratio % | — | 105 | — | 120 | 140 | 150 | — |
| | Compressing step | Included/Not included | Not included | Not included | Not included | Not included | Not included | Included | Not included |
| Evaluation item | Tracking ability | | Δ | Δ | X | Δ | Δ | X | Δ |
| | Cushioning property | | ○ | Δ | Δ | Δ | X | Δ | X |
| | Adhesive strength difference | | X | ○ | X | X | X | X | X |
| | Adhesive processability | | X | X | ○ | ○ | ○ | ○ | ○ |
| | Heat resistance | | Δ | ○ | Δ | Δ | ○ | ○ | ○ |
| | Comprehensive evaluation | | Δ | Δ | Δ | Δ | Δ | Δ | Δ |

TABLE 4

| | Item | | | Example 22 | Comparative Example 1 | Comparative Example 2 | Comparative Example 3 | Comparative Example 4 |
|---|---|---|---|---|---|---|---|---|
| Composition | Thermoplastic elastomer | Type | | a-1 | a-1 | — | — | — |
| | | Composition ratio | % by mass | 10 | 100 | — | — | — |
| | Polypropylene resin | Type | | b-2 | — | b-1 | b-2 | b-1 |
| | | Composition ratio | % by mass | 75 | — | 100 | 50 | 75 |
| | Polyethylene resin | Type | | c-1 | — | — | EVA | c-1 |
| | | Composition ratio | % by mass | 15 | — | — | 50 | 25 |
| | Resin subtotal | | % by mass | 100 | 100 | 100 | 100 | 100 |
| | Blowing agent | Composition ratio | Parts by mass | 9 | 7 | 3 | 17 | 4 |
| | Crosslinking agent | Composition ratio | Parts by mass | 3 | — | 5 | 3 | 5 |
| | Antioxidant | Composition ratio | Parts by mass | 2 | 2 | 2 | — | 2 |
| | Foam thickness | | μm | 370 | 530 | 650 | 480 | 220 |
| | Apparent density | | kg/m$^3$ | 54 | 80 | 200 | 20 | 150 |
| | Gel fraction | | % | 35 | 30 | 55 | 15 | 65 |
| | Thermal shrinkage rate | MD | % | −6 | −30 | −6 | −17 | −12 |
| | | TD | | −6 | −21 | −3 | −12 | −14 |
| | 25% compression hardness | | kPa | 60 | 30 | 350 | 85 | 210 |
| | Endothermic peak | First | °C. | 122 | — | — | 85 | 122 |
| | | Second | | 134 | — | 156 | 135 | 152 |
| | Melting heat capacity | | J/g | 65 | 15 | 108 | 65 | 55 |
| | Skin layer thickness before slicing step | | μm | 6 | 6 | 4 | 5 | 7 |
| | Thickness of pseudo skin layer on first surface side (A) | | μm | 3.3 | — | 7.2 | 5.1 | 4.1 |
| | Thickness of pseudo skin layer on second surface side (B) | | μm | 3.6 | — | 6.9 | 3.9 | 4.3 |
| | Cell wall thickness inside foam (L) | | μm | 3.2 | 3.6 | 3.8 | 4.4 | 3.4 |
| | A/L | | | 1.03 | — | 1.89 | 1.16 | 1.21 |
| | B/L | | | 1.13 | — | 1.82 | 0.89 | 1.26 |
| | Surface hardness | | ° | 68 | 21 | 90 | 65 | 85 |
| | Centerline surface roughness Ra75 | First surface portion | μm | 18 | 9 | 11 | 26 | 3 |
| | | Second surface portion | | 15 | 10 | 10 | 23 | 4 |
| | Material identity | | | ○ | ○ | ○ | ○ | ○ |
| Processing method | Slicing step | Included/Not included | | Included | Not included | Included | Included | Included |
| | Heating step | Included/Not included | | Not included | Included | Included | Included | Included |
| | | Heating temperature | °C. | — | 189 | 189 | 168 | 185 |
| | Stretching step | Included/Not included | | Not included | Included | Included | Included | Included |
| | | Stretching ratio | % | — | 150 | 150 | 150 | 150 |
| | Compressing step | Included/Not included | | Not included | Included | Included | Included | Included |

TABLE 4-continued

|  | Item | Example 22 | Comparative Example 1 | Comparative Example 2 | Comparative Example 3 | Comparative Example 4 |
|---|---|---|---|---|---|---|
| Evaluation item | Tracking ability | Δ | X | X | X | X |
|  | Cushioning property | Δ | ○ | X | X | X |
|  | Adhesive strength difference | X | X | X | ○ | X |
|  | Adhesive processability | X | X | X | X | X |
|  | Heat resistance | X | X | ○ | Δ | ○ |
|  | Comprehensive evaluation | X | X | X | X | X |

INDUSTRIAL APPLICABILITY

The present invention provides a thin foam which is excellent in heat resistance and flexibility, and with an adhesive layer, is suitable as a sealing material, a heat insulating material, a protective material in the fields of architecture, electricity, electronics, vehicles, and the like.

The invention claimed is:

1. A foam, wherein
the surface hardness of said foam measured by a micro rubber hardness tester is 30° or more and 70° or less,
the centerline average roughness Ra75 of a first surface portion on one side of said foam and of a second surface portion on the other side of said foam in the thickness direction is 5 μm or more and 20 μm or less, and
Formula (1) and Formula (2) below are satisfied in either or both of said first surface portion and said second surface portion on which a pseudo skin layer is formed, wherein the pseudo skin layer is a layered portion with a high density and a lower foaming ratio than that of the central portion of the foam, and the pseudo skin layer is formed by removing the skin layer followed by applying heat to the surface of the foam to change the shape of the cells in the vicinity of the surface;

pseudo skin layer thickness≤3 μm, and     Formula (1):

(pseudo skin layer thickness)/(thickness of cell wall inside the foam)≤1.5.     Formula (2):

2. The foam according to claim 1, wherein the thermal shrinkage rate in the length direction (MD) or in the width direction (TD) after 1 hour in a temperature environment of 100° C. is −15% to 1%, and the 25% compression hardness is 50 kPa or less.

3. The foam according to claim 1, comprising a polypropylene resin and a thermoplastic elastomer, wherein the endothermic peaks measured by a differential scanning calorimeter (DSC) occur in a range of at least 100° C. or more and 130° C. or less and at 145° C. or more, and the melting heat capacity is 50 J/g or less.

4. The foam according to claim 1, wherein said first surface portion on one side of said foam and said second surface portion on the other side of said foam in the thickness direction, and the inside portion of said foam are formed from the same resin composition.

5. A method of producing a foam according to claim 1, comprising the steps of:
foaming a resin composition comprising at least a polypropylene resin and a thermoplastic elastomer to produce a foam sheet having a skin layer of 3 μm or more on both of the top and bottom surfaces in the thickness direction;
slicing said foam sheet in the thickness direction to produce a foam sheet not having a skin layer; and
heating the foam sheet subjected to slicing.

6. The method of producing a foam according to claim 5, wherein said foam sheet is stretched at a stretch ratio of 110% or more when heated in said step of heating the foam sheet subjected to slicing.

7. The method of producing a foam according to claim 5, wherein said foam sheet is heated so that the surface temperature is within the range of Formula (3) in said step of heating the foam sheet subjected to slicing:

$Tm-20(°C.) \leq H \leq Tm+60(°C.)$     (Formula 3)

(wherein Tm: melting point (° C.) of said resin or resin composition constituting the surface of said foam sheet, H: surface temperature (° C.) of said foam sheet).

8. The method of producing a foam according to claim 5, further comprising the step of compressing said foam sheet in the thickness direction.

\* \* \* \* \*